(12) United States Patent
Nourigat

(10) Patent No.: US 6,824,850 B2
(45) Date of Patent: Nov. 30, 2004

(54) ARTICLE FOR PREVENTING PESTS FROM ENTERING A BUILDING STRUCTURE

(76) Inventor: Robert M. Nourigat, 3010 Elim, Zion, IL (US) 60099

( * ) Notice: Subject to any disclaimer, the term of this patent is extended or adjusted under 35 U.S.C. 154(b) by 52 days.

(21) Appl. No.: 10/112,384

(22) Filed: Mar. 29, 2002

(65) Prior Publication Data

US 2003/0186604 A1 Oct. 2, 2003

(51) Int. Cl.[7] .......................... B32B 33/00; B32B 9/00; B32B 5/12; B32B 27/12; B32B 5/02; B32B 15/04; B32B 7/12; B32B 27/04; A01M 1/10; A01M 17/00
(52) U.S. Cl. .................. 428/41.8; 428/114; 428/202; 428/343; 442/123; 442/125; 442/324; 43/118; 43/132.1
(58) Field of Search ................. 442/123, 125, 442/324; 428/41.8, 114, 202, 343; 43/118, 132.1

(56) References Cited

U.S. PATENT DOCUMENTS

| | | | | |
|---|---|---|---|---|
| 2,315,772 A | * | 4/1943 | Closs | 43/131 |
| 2,911,756 A | * | 11/1959 | Geary | 43/114 |
| 4,765,982 A | * | 8/1988 | Ronning et al. | 424/403 |
| 5,589,390 A | * | 12/1996 | Higuchi et al. | 43/132.1 |
| 6,133,197 A | * | 10/2000 | Chen et al. | 504/359 |

* cited by examiner

Primary Examiner—Elizabeth M. Cole
Assistant Examiner—Jeremy R Pierce
(74) Attorney, Agent, or Firm—Christopher J. Scott; Charles F. Meroni, Jr.; Meroni & Meroni, P.C.

(57) ABSTRACT

The present invention discloses an article for preventing pests from gaining entrance to a building structure. The article comprises a length of fibrous fabric and a plurality of adhesive strips. The fabric is designed for adhesive attachment to a dwelling or building structure adjacent points of entry and the adhesive strips are designed for adhesively attaching the fabric in snug adjacency to the outfitted building structure. The fabric is impregnated with at least one pesticide composition and has outwardly extending fibers for entangling the legs of pests attempting to gain entrance to the building structure by maneuvering across the fabric to points of entry. These outwardly extending fibers thus directly deposit pesticide composition on the pests for preventing them from gaining entrance to the building structure. Importantly, the fabric is brilliantly colored or has highly light reflective coloration for attracting the pests to the pesticide-impregnated fabric for contact treatment.

4 Claims, 3 Drawing Sheets

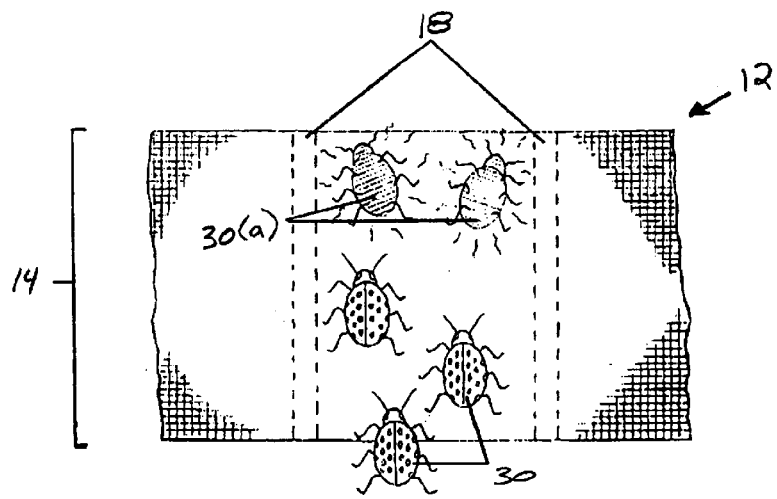
Fig. 4
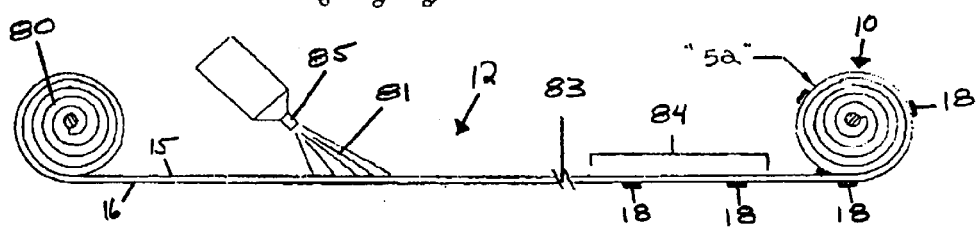
Fig. 5
Fig. 5a
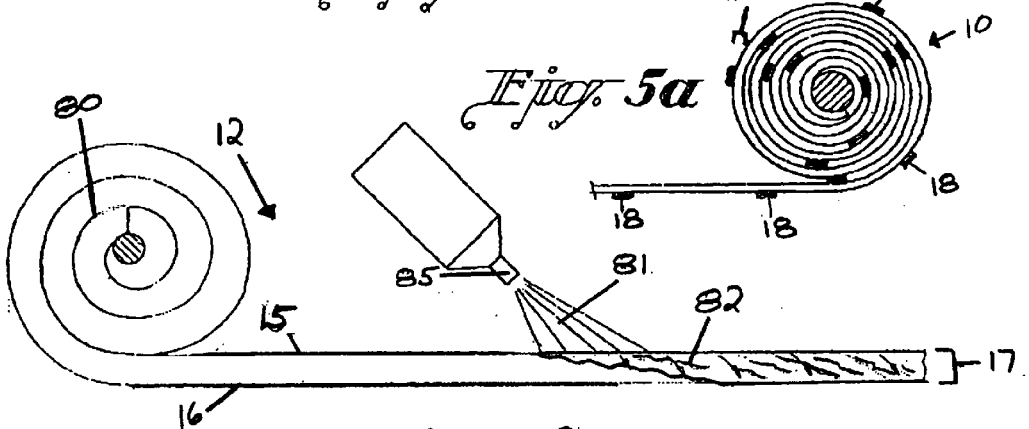
Fig. 6

ARTICLE FOR PREVENTING PESTS FROM ENTERING A BUILDING STRUCTURE

BACKGROUND OF THE INVENTION

1. Field of the Invention

The present invention relates to an article of manufacture for controlling invertebrate pest behavior generally, and, more particularly, to an article of manufacture for preventing Asian lady beetles and similar other insects from gaining entrance to dwellings and similar other building structures and the methods of using/manufacturing the same.

2. Description of the Prior Art

The lady bug, commonly referred to as the Asian lady beetle, is a pest as well as a beneficial organism. Admittedly, Asian lady beetles become "pests" mainly by their presence in unwanted areas as is the case in dwelling infestations or infestations in similar other building structures. It is noted that Asian lady beetles generally do not feed on or damage anything in the traditional home and, further, do not generally bite people or pets, do not infest stored food and do not destroy household furnishings. Asian lady beetles generally do not carry diseases harmful to humans or pets, nor do they usually breed indoors. However, when large numbers of Asian lady beetles take up residence in a dwelling or similar other building structure, they will crawl over walls, windows, light fixtures and most any other surface, thus becoming a nuisance. It will be seen that the sheer number of Asian lady beetles which may infest a dwelling or similar other building structure can become highly problematic, thus leading to a need for controlling these pests.

Because the Asian lady beetle is a tree-dwelling insect, dwellings and similar other building structures situated in forested areas are especially prone to infestation. Suburban and landscaped industrial settings adjacent to wooded areas have also had large Asian lady beetle aggregations. Asian lady beetles congregate in large numbers during the late fall rather than disperse to spend the winter (overwinter) individually under bark or in leaf litter, as do most other lady beetles. Asian lady beetles prefer to cluster on the sides of dwellings and similar other building structures, eventually working their way into the building through small cracks or crevices, or natural breaks in the window panes, door jams or foundations as the temperatures decrease. Essentially, the congregating Asian lady beetles are seeking a suitable place to overwinter. Once inside the building, Asian lady beetles hibernate, until the first warm days of late winter or early spring, when they seem to come to life again and begin crawling about.

Asian lady beetles tend to be attracted to lighter colored buildings and especially to those that are illuminated by the sun (typically the south or southwest side of a given building structure). Darker colored buildings or buildings in the shade are less likely to encounter Asian lady beetle infestation. After spending the winter months tucked away in a wall void or other secluded place, becoming active in late winter, Asian lady beetles often find themselves inside the dwelling rather than outside. At this time Asian lady beetles tend to begin seeking an escape to the out-of-doors. This reawakening may take place over several weeks, depending on temperatures and the size of the population.

Once Asian lady beetles have established themselves in the dwelling or similar other building structure, there are not many treatment options. However, it is well known that prevention of Asian lady beetle infestation is perhaps the best of all treatment options, which is best achieved in the autumn. To help prevent Asian lady beetles, cluster flies, box elder bugs (and other pests of the sort having similar infestation habits) from entering dwellings and similar other building structures in the autumn, most experts in the pertinent art have recommended applying or spraying fast-acting, residual synthetic pyrethroids around eaves, attic vents, windows, doors, under-fascia lips, soffits, siding (including under lips) and any other possible points of entry, concentrating on the south and southwest sides. Further, known mechanical means of preventing Asian lady beetles and habitually similar other pests include sealing cracks and utility service openings with caulk, fixing broken window screens and door jams, plugging cracks in the foundation or roof as well as similar exclusion-type activities which help prevent the entry of Asian lady beetles into the dwelling or similar other building structure.

The state of the art, however, has proved largely ineffectual in preventing Asian lady beetles and habitually similar other pests from entering and infesting a dwelling. Residual sprays, having been applied to dwellings or building structures quickly become ineffectual due to environmental conditions. Further, spraying dwellings and similar other building structures with pesticide often results in large quantities of pesticide being wasted. Further, implementing fully effectual mechanical means of exclusion (eg: tightly screening windows, louvers, air vents, and tightly caulking all cracks around windows, chimneys, trim, splits and holes in siding) can be very time consuming and expensive.

What is needed therefore is a more efficient, inexpensive, less time consuming method or article for preventing Asian lady beetles and habitually similar other pests from entering a dwelling or building structure. In this regard, an article that places an effective amount of pesticide adjacent to points of entry would be useful, particularly for homeowners/business owners who are desirous of keeping windows and siding free from excess pesticide. Further, an article that decreases the potential amount of excess pesticide that may come into contact with passersby would be greatly beneficial.

It is noted that the prior art is replete with examples of inventive solutions for controlling general pest or insect behavior. Among these inventions are many disclosures, which teach the use of pesticide-impregnated or repellent-impregnated fabrics to repel insects from the fabric. For example, U.S. Pat. No. 279,852, which issued to Atkins, discloses a bale band or tie treated with an insect repelling composition to render the same insect proof, substantially as described in the specification of this patent. Further, in this vein, U.S. Pat. Nos. 339,810; 676,375; 2,555,330; 2,564,663; and 2,768,927 all disclose fabric impregnated with various types of specific insect repelling compositions.

Further, U.S. Pat. No. 2,911,756, which issued to Geary, discloses an Insect Combatting Device. This invention teaches a device comprising a flexible sheet backing, a normally tacky, pressure sensitive adhesive untied to one surface of said backing, an absorptive layer united to the other surface of said backing and a layer containing an insect attractant and an insecticide united to said absorptive layer, which layer is preferably of a tacky/sticky nature so as to entangle the attracted insect.

U.S. Pat. No. 4,765,982 ('982 Patent), which issued to Ronning et al., discloses an Insect Control Device. This invention comprises alternatively woven or non-woven group of fibers, which fibers have a sustained release insect control agent self-adhered thereto. The compositions and device disclosed control insect activity by providing an effective level of the control agent in the area where control is desired for an extended period of time. The desired area of control is essentially left open-ended. The fibers are of a specific type as outlined in the '982 Patent.

U.S. Pat. No. 5,916,580, which issued to Shober et al., discloses a Method of Pest Control. This invention teaches a netting impregnated with insect repellent, which netting is then positioned around the area to be protected, such as a pillow, mattress, or domestic pet bed. The specific application is designed to control the movement of house dust mites.

There are further several uncovered United States Patents, which teach the use of color to attract insects. For example, U.S. Pat. No. 5,896,695, which issued to Walker, discloses a Device for Controlling Crawling or Flying Insects. This invention comprises brightly colored luminescent paint to attract insects. Further U.S. Pat. No. 5,992,087, which issued to Chu et al., discloses a Whitefly Trap. This invention does not require bait or adhesive but does utilize the principle of attracting insects through the use of color, in this case the color yellow.

It is noted after a review of the prior art, however, that none of the prior art patents teach the use of pesticide-impregnated, felt-like fabric for adhesive attachment to dwellings or building structures adjacent to points of entry, which fabric is specifically colored to attracts pest to the fabric for contact treatment thereof and the accordant prevention of dwelling infestation.

SUMMARY OF THE INVENTION

Accordingly, one objective of the present invention is to provide an article of manufacture for controlling general invertebrate pest behavior. Another objective of the present invention is to provide an article of manufacture for controlling habitually similar behaviors of pests classified under the Class Insecta, and particularly those pests of the Families Coccinellidae, Calliphoridae, and Rhopalidae. In this last regard, another objective of the present invention is to provide an article of manufacture for controlling pest behavior, which includes dwelling or building structure infestation by way of pest aggregation and eventual entry through structural points of entry. Most specifically, the present invention provides an article of manufacture for controlling Asian lady beetle, cluster fly and boxelder bug behavior. In this regard, a further objective of the present invention is to provide an inexpensive article of manufacture for controlling the stated pest behavior. Yet another of objective of the present invention is to provide an article of manufacture which may be easily attached to dwellings and/or other building structures adjacent to points of entry for preventing Asian lady beetles and habitually similar pests from gaining entrance to the dwelling or building structure. Still another object of the present invention is to provide a specifically colored article of manufacture for attracting Asian lady beetles and habitually similar pests. Still another objective of the present invention is to provide a contact treatment article of manufacture, which directly deposits pesticide on attracted Asian lady beetles and habitually similar pests for preventing the pests from gaining entrance to outfitted dwellings and building structures. In this regard, it is a further objective of the present invention to provide an article which exposes an effective yet minimal amount of residual pesticide for achieving contact treatment, which greatly improves upon safety considerations paramount in residual spray applications. Yet another object of the present invention is to provide methods of using/manufacturing the disclosed article for controlling the stated pest behavior.

To attain these objectives, the claimed invention generally comprises the combination of a length of fibrous felt fabric and a plurality of evenly spaced adhesive strips. The length of fibrous felt fabric is designed for adhesive attachment to the dwelling or similar building structure adjacent to points of entry and the evenly spaced adhesive strips are designed for adhesively attaching the fibrous felt fabric in snug adjacency to the building structure. The fabric is saturated with at least one pesticide composition and left to dry. The fabric has outwardly extending fibers for entangling the legs of Asian lady beetles or habitually similar pests attempting to gain entrance to the dwelling or building structure by maneuvering across the fabric to points of entry. These outwardly extending fibers thus directly deposit pesticide composition on the Asian lady beetles or habitually similar pests for preventing them from gaining entrance to the building structure. Additionally, the evenly spaced adhesive strips each have a strip thickness of about $\frac{1}{32}$-inch for attaching the fabric in snug adjacency to the dwelling or building structure. The snugly adjacent fabric thus further physically contacts Asian lady beetles and habitually similar pests attempting to gain entrance to the dwelling or building structure by maneuvering between the fabric and the building structure. By physically contacting the Asian lady beetles or habitually similar pests, the fabric further directly deposits pesticide composition on the pests to further prevent pests from gaining entrance to the building structure. Importantly, the fabric is brilliantly colored or has highly light reflective coloration for attracting the Asian lady beetles and habitually similar pests to the pesticide-impregnated fabric for contact treatment.

BRIEF DESCRIPTION OF THE DRAWINGS

Other features of my invention will become more evident from a consideration of the following detailed description of my patent drawings, as follows:

FIG. 4 is a fragmentary front view of the article for preventing Asian lady beetles from entering a building structure adhesively attached to a building structure with enlarged characteristic pests shown in various states of progression across the superior felt surface.

FIG. 5 is a fragmentary side view representation of the method of manufacture of the article for preventing Asian lady beetles from entering a building structure.

FIG. 5(a) is a fragmentary enlarged side view representation of the last stages of the method of manufacture of the article for preventing Asian lady beetles from entering a building structure.

FIG. 6 is a fragmentary enlarged side view representation of the first stages of the method of manufacture of the article for preventing Asian lady beetles from entering a building structure.

DETAILED DESCRIPTION OF THE PREFERRED EMBODIMENT

Preferred Embodiment

Figure 1:
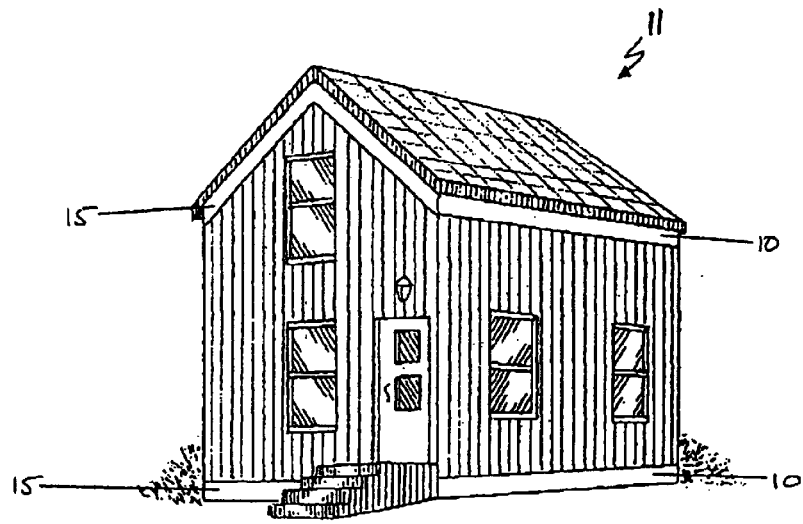
FIG. 1 is a functional view of the article for preventing Asian lady beetles from entering a building structure as it is adhesively attached to a building structure.

Referring now to the drawings, the presented article of manufacture 10 for controlling pest behavior is generally illustrated in FIG. 1. It is contemplated that article 10 may be used to control general invertebrate pest behavior, pests classified under the Class Insecta, pests classified under the Families Coccinellidae, Calliphoridae, or Rhopalidae, or most specifically, Asian lady beetle, cluster fly or boxelder bug behavior. In this regard, article 10 may be used not only for controlling behavior of Asian lady beetles (or lady bugs) 30, cluster flies, and boxelder bugs, but also spiders, crickets, ants, earwigs, millipedes, centipedes, sow bugs, pill bugs, meal moths, grain beetles, roaches and fleas. Furthermore, article 10 is designed to prevent Asian lady beetles 30 and habitually similar other pests from gaining entrance to a dwelling or similar other building structure 11 as further shown in FIG. 1. In this regard, it is further contemplated that article 10 may be characteristically used on houses, apartment buildings, stores, offices, barns, factories and the like, whether the building structure is used for residential, commercial, industrial, or agricultural purposes.

FIG. 1 illustrates article 10 as it may adhesively attach to building structure 11 adjacent to main points of entry, namely underneath and adjacent to the eaves of building structure 11 and/or in superficial adjacency to the footing of building structure 11. Article 10 may also be rolled out and adhesively attached in adjacency to other points of entry such as doors, windows, attics and crawlspaces. Further, article 10 may also be used, for example, in closets, under grain sacks, around trees in orchards, under carpeting, under door mats, under domesticated pet beds, on shelves or in cabinets. These listed areas are contemplated to be exemplary in nature and should not be construed to limit the applications in which article 10 may be used. Further, the preferred method of attaching article 10 to these stated alternative application areas is by way of an adhesive means.

Article of manufacture 10 for preventing Asian lady beetles and habitually similar pests from gaining entrance to building structure 11 generally comprises a length of fibrous felt fabric 12 for adhesive attachment to building structures 11, as shown in FIGS. 2–7, inclusive. Fibrous felt fabric 12 or similar other fibrous fabric is preferably adhesively attached adjacent to points of entry of building structure 11. During manufacture, fibrous felt fabric 12 is saturated with at least one pesticide composition as shown in FIG. 5 and FIG. 6. The pesticide composition is preferably microcapsulated and further is preferably selected from the group consisting of DEMAND CS brand insecticide and GENTROL brand insect growth regulator.

DEMAND CS brand insecticide comprises an active ingredient and inert ingredients. The active ingredient of DEMAND CS brand insecticide is Lambda-cyhalothrin {[(1α(S*), 3α(Z)]-(±)-cyano-(3-phenoxyphenyl)methyl-3-(2-chloro-3,3,3-trifluoro-1-propenyl)-2,2-dimethylcyclopropanecarboxylate}, which is 9.7% by weight and the inert ingredients are 90.3% by weight. Characteristically, DEMAND CS brand insecticide is diluted with water in varying amounts to achieve the desired strength of the insecticide composition for use in controlling the behavior of Asian lady beetles, cluster flies, box elder bugs, and other pests of this sort having similar infestation habits. In this regard, DEMAND CS brand insecticide may be mixed with water such that 0.4 fluid ounces are mixed with 128 fluid ounces of water for use in lighter infestations and may be mixed with water such that 0.8 fluid ounces are mixed with 128 ounces of water for use in heavier infestations. DEMAND CS brand insecticide is manufactured by ZENECA INC. Professional Products with current business address of 1800 Concord Pike, Wilmington, Del., 19897.

GENTROL brand insect growth regulator also comprises an active ingredient and inert ingredients. The active ingredient of GENTROL brand insect growth regulator is (S)-Hydroprene[Ethyl(2E, 4E, 7S)-3,7,11-trimethyl-2,4-dodecadienoate], which is 9.0% by weight and the inert ingredients are 91.0% by weight. Characteristically, GENTROL brand insect growth regulator is diluted with water in varying amounts to achieve the desired strength of the insect growth regulator composition for use in controlling the behavior of meal moths, grain beetles, roaches, fleas and other pests of this sort having similar infestation habits. In this regard, GENTROL brand insect growth regulator may be mixed with water such that 1.0 fluid ounce is mixed with 128 fluid ounces of water for use in general infestations. GENTROL brand insect growth regulator is manufactured by ZOECON CORPORATION with current business address of 12200 Denton Drive, Dallas, Tex., 75234.

Figures 2, 3:
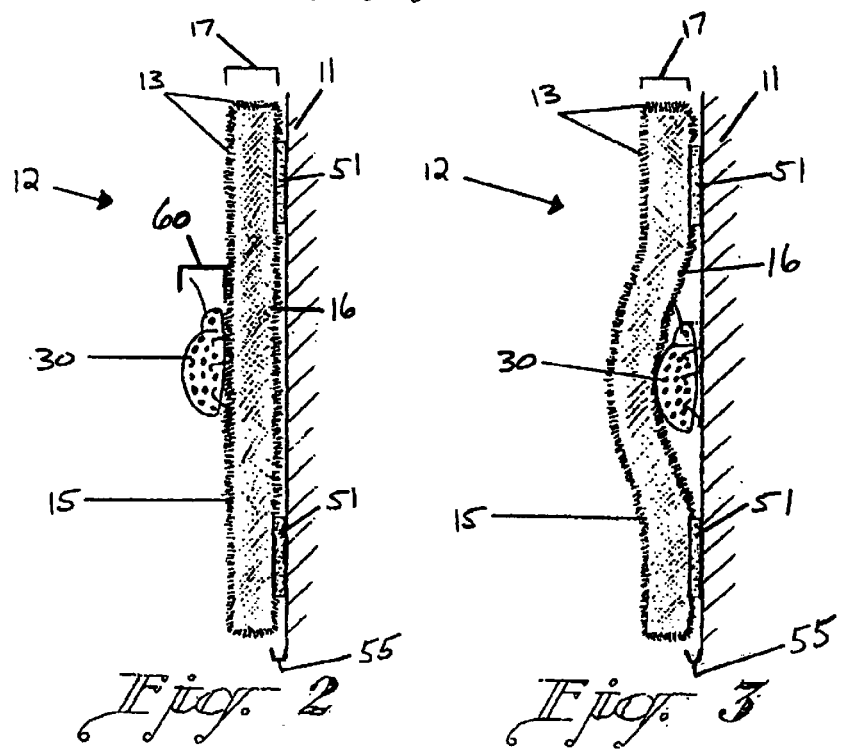
FIG. 2 is a fragmentary enlarged cross-sectional view of the article for preventing Asian lady beetles from entering a building structure adhesively attached to a building structure with characteristic pest shown on the superior felt surface.
FIG. 3 is a fragmentary enlarged cross-sectional view of the article for preventing Asian lady beetles from entering a building structure adhesively attached to a building structure with characteristic pest shown intermediate the inferior felt surface and building structure.

As shown in FIG. 2, fibrous felt fabric 12 further comprises outwardly extending fibers 13 for entangling the legs of Asian lady beetles 30 or habitually similar pests attempting to gain entrance to building structure 11 by maneuvering across fibrous felt fabric 12 to points of entry. For best results, it is contemplated that outwardly extending fibers 13 preferably number from about 80 to 100 per square inch and are sized and shaped to entangle pest legs. Outwardly extending fibers 13 thus directly deposit pesticide composition on Asian lady beetles 30 or habitually similar pests to provide contact treatment for preventing Asian lady beetles 30 or habitually similar pests from gaining entrance to building structure 11 as shown in FIG. 4 at 30(a).

Figure 7:
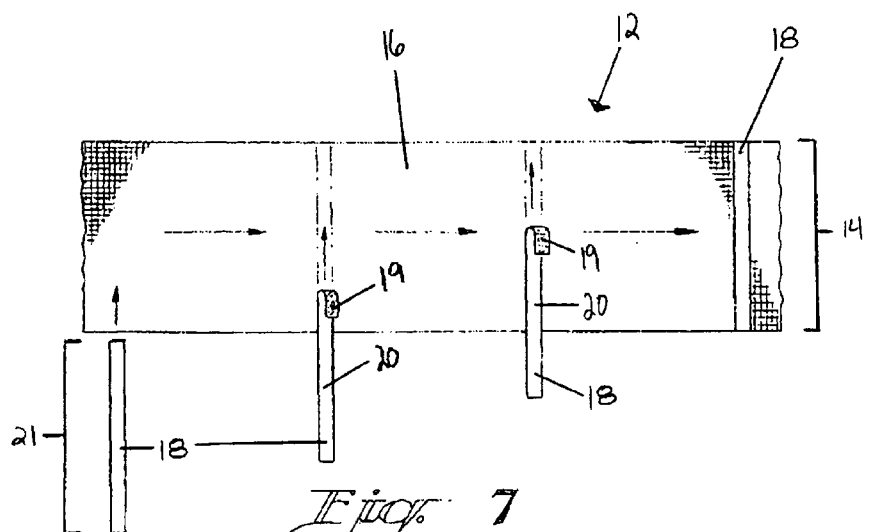
FIG. 7 is a fragmentary rear view representation of the article for preventing Asian lady beetles from entering a building structure showing preferred adhesive means being applied to the inferior felt surface.
Figure 8:
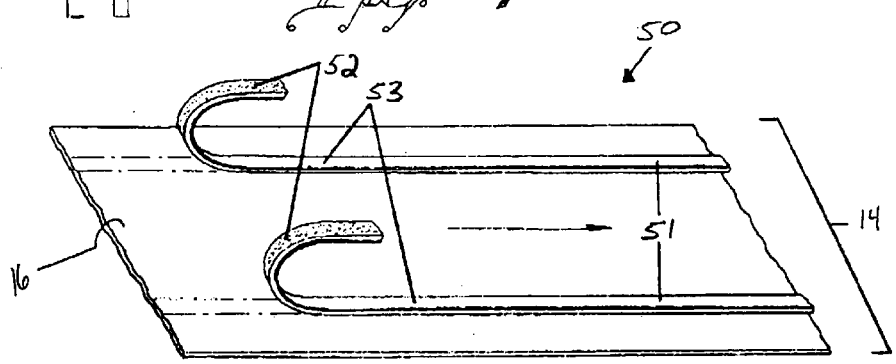
FIG. 8 is a fragmentary perspective view representation of the article for preventing Asian lady beetles from entering a building structure showing alternative adhesive means being applied to the inferior felt surface.

Fibrous felt fabric 12 further comprises a felt width 14 as shown in FIG. 4, FIG. 7 and FIG. 8; a felt length; a superior felt surface 15 or pesticide application surface, as shown in FIG. 1, FIG. 2, FIG. 3, FIG. 5, FIG. 6 and FIG. 9; an inferior felt surface 16 or pesticide emersion surface as shown in FIG. 2, FIG. 3, FIG. 5, FIG. 6, FIG. 7 and FIG. 8; and a felt thickness 17 as shown in FIG. 2, FIG. 3, and FIG. 6. Felt width 14 preferably measures about 9 inches and the felt length preferably measures about 12 feet. It is contemplated that a felt width 14 measuring about 9 inches is the preferred structural width in terms of fostering the greatest potential surface area for pest attraction without needlessly detracting from facade aesthetics of building structure 11. It is further contemplated that a felt length measuring 12 feet is the preferred structural length in terms of fostering the greatest potential surface area for pest attraction without becoming needlessly cumbersome to install.

Fibrous felt fabric 12 preferably comprises polyester felt fabric and felt thickness 17 preferably measures about 1/16 inch for retaining a minimal yet effective amount of applied pesticide composition. Utilizing a fibrous felt material of this type and thickness is preferable insofar as the material will have relatively little weight added to it when it becomes wet by contact with environmental moisture and the like. It is contemplated that thinner materials are preferable in this regard to maintain fibrous felt fabric 12 in an adhesively attached position, which position will not tend to sag or become adhesively detached from building structure 11 by any environmental moisture contacting fibrous felt fabric 12.

Superior felt surface 15 has light reflective coloration for attracting Asian lady beetles 30 or habitually similar pests. In this regard, it is contemplated that the preferred light reflective, pest attracting coloration is substantially of a brilliant white or brilliant sunburst yellow coloration. However, while it is noted that Asian lady beetles 30 and habitually similar pests are generally attracted to bright or brilliant colors, the color of the base building structure 11 may also be bright or brilliant. In these cases, a contrastingly brilliantly colored superior felt surface 15 is recommended. For example, on a base house with dark blue coloration, a brilliant white or brilliant suburst yellow superior felt surface 15 is contemplated. By way of comparison, on a house with substantially white coloration, a brilliant sunburst yellow superior surface 15 is contemplated. It is further contemplated that the color of superior felt surface 15 may be tailored to meet the needs of the consumer insofar as one color may be better adapted to attract a certain type of habitually similar pest than another color. Accordingly, superior felt surface 15 may be functionally colored to attract a given pest for extermination purposes.

Figure 9:
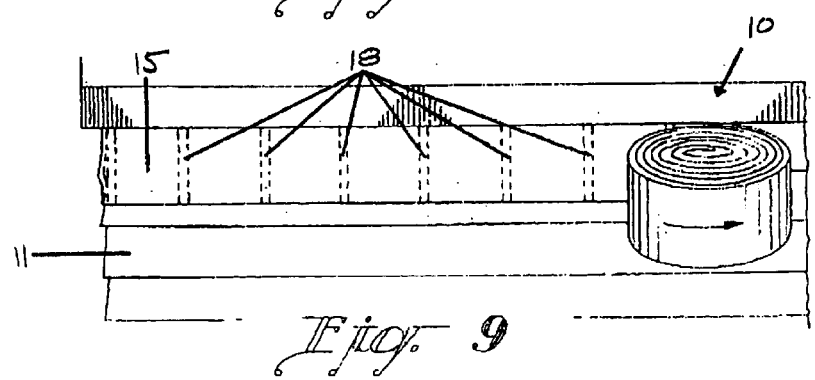
FIG. 9 is a fragmentary front view representation of the article for preventing Asian lady beetles from entering a building structure being adhesively attached to a building structure.

Inferior felt surface 16 is generally designed to receive a plurality of evenly spaced adhesive strips 18 as shown in FIG. 4, FIG. 5, FIG. 5(a), FIG. 7, and FIG. 9. Adhesive strips 18 are for adhesively attaching fibrous felt fabric 12 to building structure 11. As shown in FIG. 7, adhesive strips 18 each further comprise a superior adhesive surface 19, an inferior adhesive surface 20, a strip length 21, and a strip thickness 22 as shown in FIG. 5(a). Additionally, adhesive strips 18 each preferably have a strip width measuring about ¾ inch. It is contemplated that a strip width of ¾ inch is the preferred strip width in terms of fostering the greatest potential surface area for adhesive attachment to inferior felt surface 16 without needlessly compromising the adhesive strength of adhesive strips 18. In this regard, SCOTCH brand poster tape, or double-sided clear tape, is the preferred type of adhesive stripping to be used. This type of adhesive stripping is further preferable in that it does not damage paint or siding on building structures. Adhesive strips 18 are aligned laterally across felt width 14 as shown in FIG. 4, FIG. 7 and FIG. 9. As further shown, strip lengths 21 are each preferably substantially equal in dimension to felt width 14.

Superior adhesive surfaces 19 each have exposed adhesive for attachment to inferior felt surface 16 and are adhesively attached to inferior felt surface 16 in a manner such that the space between each successively applied adhesive strip 18 is substantially equal in dimension as shown in FIG. 5, FIG. 5(a), FIG. 7 and FIG. 9. In this regard, adhesive strips 18 are preferably spaced at 10–12 inch intervals. Inferior adhesive surfaces 20 each further comprise selectively removable adhesive covering means. Preferably, the adhesive covering means is a paper-like covering. SCOTCH brand poster tape has a paper-like covering that is easily stripped off to expose the adhesive. The adhesive covering means is for selectively exposing inferior adhesive surfaces 20 at the election of the consumer when the fibrous felt fabric 12 is adhesively attached to building structure 11 as shown in FIG. 9.

Strip thickness 22 preferably measures about $\frac{1}{32}$ inch for attaching fibrous felt fabric 12 in snug adjacency to building structure 11. Once attached, the snugly adjacent fibrous felt fabric 12 is designed to physically contact Asian lady beetles 30 or habitually similar pests attempting to gain entrance to building structure 11 by maneuvering between or intermediate fibrous felt fabric 12 and building structure 11. The snugly adjacent fibrous felt fabric 12 thus directly deposits pesticide composition on Asian lady beetles 30 or habitually similar pests attempting to gain entrance to building structure 11. This direct deposit of pesticide compositions is for contact treatment purposes and the accordant prevention of Asian lady beetles 30 and habitually similar pests from gaining entrance to building structure 11.

It should be noted that Asian lady beetles 30 and habitually similar pests each inherently have a pest height 60 as referenced most clearly in FIG. 2 (and as comparatively illustrated in FIG. 3). Pest height 60 may preferably be defined as the distance from the inferior most portion of a pest's body to the superior most portion of a pest's body. From a comparative inspection of FIGS. 2 and 3 it will be seen that pest height 60 is preferably of greater magnitude than strip thickness 22. In this regard, it is contemplated that the preferred strip thickness 22 is about $\frac{1}{32}$ inch so as to effectively place or situate fibrous felt fabric 12 in close proximity to building structure 11.

As shown in FIG. 4, when pests such as Asian lady beetles 30 or habitually similar pests attempt to gain entrance to building structure 11 by either maneuvering intermediate fibrous felt fabric 12 and building structure 11 as further shown in FIG. 3 or by maneuvering across fibrous felt fabric 12 to points of entry as further shown in FIG. 2, the pests undergo or experience contact treatment and accordingly are terminated or thwarted from infesting the building. It is contemplated that Asian lady beetles 30 or habitually similar pests may also attempt to gain entrance to building structure 11 by maneuvering intermediate fibrous felt fabric 12 and building structure 11 by crawling with legs contacting inferior felt surface 16. It is contemplated that outwardly extending fibers 13 may further directly deposit pesticide composition on Asian lady beetles 30 or habitually similar pests for preventing the same from gaining entrance to building structure 11, although this stated pest orientation is not specifically illustrated.

Alternative Embodiment

A second embodiment of the article of manufacture 50 for controlling pest behavior is generally illustrated in FIG. 8. The second embodiment of article 50 is virtually identical to the preferred embodiment of article 10 save for the orientation and number of the evenly spaced adhesive strips 51 as shown in FIG. 2, FIG. 3 and FIG. 8. Article 50 preferably has two evenly spaced adhesive strips 51 that are aligned longitudinally along the felt length. Adhesive strips 51 are similarly for adhesively attaching fibrous felt fabric 12 to building structure 11. Adhesive strips 51 each further comprise a superior adhesive surface 52 as shown in FIG. 8, an inferior adhesive surface 53 as shown in FIG. 8, a strip length, and a strip thickness 55 as shown in FIG. 2 and FIG. 3. The measured thickness of strip thickness 55 is equal to the preferred measured thickness of strip thickness 22. Additionally, adhesive strips 51 each preferably have a strip width measuring about ¾ inch. It is contemplated that a strip width of ¾ inch is the preferred strip width in terms of fostering the greatest potential surface area for adhesive attachment to inferior felt surface 16 without needlessly compromising the adhesive strength of adhesive strips 50. In this regard, SCOTCH brand poster tape, or double-sided clear tape is the preferred type of adhesive stripping to be used. This type of adhesive stripping is preferable in that it does not damage paint or siding when attached to building structures. Strip lengths are each preferably substantially equal in dimension to the felt length. Further, adhesive strips 51 of article 50 are also spaced apart to assist in maintaining the length of fibrous felt fabric 12 in snug adjacency to building structure 11, the preferable spacing being about 7 inches apart at substantially all points along the length of fibrous felt fabric 12.

Inferior adhesive surfaces 53 each further comprise selectively removable adhesive covering means. Preferably, the adhesive covering means is a paper-like covering. SCOTCH brand poster tape has a paper-like covering that is easily stripped off to expose the adhesive. The adhesive covering means is for selectively exposing inferior adhesive surfaces 53 at the election of the consumer when the fibrous felt fabric 12 is adhesively attached to building structure 11.

Strip thickness 55 preferably measures about 1/32 inch for attaching fibrous felt fabric 12 in snug adjacency to building structure 11. Once attached, the snugly adjacent fibrous felt fabric 12 is designed to physically contact Asian lady beetles 30 or habitually similar pests attempting to gain entrance to building structure 11 by maneuvering between fibrous felt fabric 12 and building structure 11 as shown in FIG. 3. The snugly adjacent fibrous felt fabric 12 thus directly deposits pesticide composition on Asian lady beetles 30 or habitually similar pests attempting to gain entrance to building structure 11. This direct deposit of pesticide compositions is for contact treatment purposes and the accordant prevention of Asian lady beetles 30 and habitually similar pests from gaining entrance to building structure 11.

Preferred Method of Manufacture

The preferred method of manufacture of article 10 comprises the steps of (1) providing a rolled length 80 of fibrous felt fabric 12 as described above and as shown in FIG. 5; (2) unrolling the rolled fibrous felt fabric 12 preferably in a substantially horizontal plane preferably at a constant rate of speed, (3) spraying superior felt surface 15 with at least one pesticide composition 81 as further shown in FIG. 6, which is preferably microcapsulated and preferably selected from the group consisting of DEMAND CS brand insecticide and GENTROL brand insect growth regulator, (4) allowing the sprayed pesticide composition to uniformly saturate fibrous felt fabric 12 from superior felt surface 15 to inferior felt surface 16 as shown in FIG. 6 at 82, thus impregnating fibrous felt fabric 12 with pesticide composition 81; (5) allowing the impregnated fibrous felt fabric 12 to dry as indicated at 83 of FIG. 5; (6) applying a plurality of evenly spaced adhesive strips 18 to inferior felt surface 16 as shown in FIG. 7, thus forming a fibrous felt fabric and adhesive strip assembly 84 as shown in FIG. 5; and (7) rolling the unrolled fibrous felt fabric and adhesive strip assembly 84 into a rolled article of manufacture 10 for preventing Asian lady beetles 30 and habitually similar pests from gaining entrance to building structure 11 as shown in FIG. 5 and FIG. 5(a). At the election of the consumer, rolled article of manufacture 10 may be adhesively attached to building structure 11 by unrolling article of manufacture 10 as shown in FIG. 9 such that article 10, once installed, stands ready for attracting pests and controlling pest behavior as herein described.

The method of manufacture of article 10 for preventing Asian lady beetles 30 and habitually similar pests from gaining entrance to building structure 11 includes a pesticide application or spray step as noted above. Preferably, the pesticide composition is sprayed utilizing an even flat fan-type nozzle 85 spatially located about eighteen above the unrolled length 80 of fibrous felt fabric 12 to achieve uniform pesticide composition application across felt width 14 as further shown in FIG. 6. In this regard, excellent results have been achieved using a B&G 5800 brand spray nozzle with pressure at about 35–45 psi. The diluted pesticide composition/water mixture is preferably applied to fibrous felt fabric 12 in a quantity of about 1 fluid ounce per square foot at a substantially constant rate of speed of about four seconds per square foot. Given a preferred felt width of 9 inches, the preferred rate of unrolling speed is about 4 inches per second.

Alternative Method of Manufacture

An alternative method of manufacture herein disclosed involves the manufacture of article 50 for controlling pest behavior. The alternative method of manufacture is virtually identical to the preferred method of manufacture of article 10 save for the application and number of evenly-spaced adhesive strips 51, as herein described.

The reader will see that the article of manufacture disclosed herein provides an article of manufacture for controlling general invertebrate pest behavior. It will be further seen that the present invention provides an article of manufacture for controlling habitually similar behaviors of pests classified under the Class Insecta. In this last regard, it will be seen that the present invention provides an article of manufacture for controlling pest behavior, which includes dwelling or building structure infestation by way of pest aggregation and eventual entry through structural points of entry. It will be further seen that most specifically, the present invention provides an article of manufacture for controlling Asian lady beetle, cluster fly and boxelder bug behavior as these organisms exhibit habitually similar behavior. In this regard, it will be further seen that the present invention provides an inexpensive article of manufacture for controlling the stated pest behavior, which may be easily attached to dwellings and/or other building structures adjacent to points of entry for pests from gaining entrance to the dwelling or building structure. It will still further be seen that the present invention provides a specifically colored article of manufacture for attracting Asian lady beetles and habitually similar pests to effectively provide contact treatment for preventing pests from entering a dwelling or building structure. It will thus be seen that the present invention directly deposits pesticide on attracted Asian lady beetles and habitually similar pests for preventing the pests from gaining entrance to outfitted dwellings and building structures. In this regard, it will thus be further seen that the present invention provides an article, which exposes an effective yet minimal amount of residual pesticide for achieving contact treatment, which greatly improves upon safety considerations paramount in residual spray applications. Still further, it will be seen that the present invention provides a method of manufacture of the disclosed article for controlling the stated pest behavior.

While my above description contains many specificities, these should not be construed as limitations on the scope of the invention, but rather as an exemplification of the invention. For example, the fibrous felt fabric need not be made of polyester felt. So long as the fibrous fabric has outwardly extending fibers for entangling the legs of pests maneuvering across the article to points of entry, the fibrous fabric successfully fulfills its contactive treatment purpose. Further, so long as the fibrous fabric is thin, lightweight, capable of being impregnated with at least one pesticide composition, and capable of retaining the pesticide composition for prolonged periods of time, the fibrous fabric further successfully fulfills its contactive treatment purpose. A fibrous fabric made of polyester felt preferably fulfills these contactive treatment purposes.

The pesticide composition need not be selected from a group consisting of DEMAND CS brand insecticide and GENTROL brand insect growth regulator. So long as the pesticide composition may be properly applied to the fibrous fabric in an effective amount for contact treatment purposes substantially as described herein, the pesticide composition successfully its contact treatment purpose. Other effective pesticide compositions are known in the art and may well be applied to the fibrous fabric to achieve excellent results. Given the current state of pesticide art, the preferred pesticide composition may be selected from the group consisting of DEMAND CS brand insecticide and GENTROL brand insect growth regulator.

The pesticide composition need not be applied to the article prior to consumer usage. For example, it is contemplated that a segment of consumers may be desirous of obtaining the article of manufacture without pre-applied pesticide compositions. These consumers may then apply a consumer chosen pesticide composition to the article of manufacture once it is adhesively attached to a building structure. Furthermore, over time and exposure to environmental conditions, the pre-applied pesticide composition will eventually lose its effectiveness and need to be reapplied to the article of manufacture. At this time, the article of manufacture may properly be saturated and impregnated with a consumer selected pesticide composition.

Accordingly, although the invention has been described by reference to a preferred embodiment, it is not intended that the novel device be limited thereby, but that modifications thereof are intended to be included as falling within the broad scope and spirit of the foregoing disclosure, the following claims and the appended drawings.

I claim:

1. An article of manufacture for preventing Asian lady beetles and habitually similar pests from gaining entrance to a building structure, the article of manufacture comprising:

a length of fibrous felt fabric for adhesive attachment to the building structure adjacent points of entry, the fibrous felt fabric being saturated with a pesticide composition, the pesticide composition comprising an active ingredient and inactive ingredients, the active ingredient comprising Lambda-cyhalothrin, the fibrous felt fabric having outwardly extending fibers for entangling the legs of Asian lady beetles or habitually similar pests attempting to gain entrance to the building structure by maneuvering across the fibrous felt fabric to points of entry, the outwardly extending fibers thus directly depositing pesticide composition on Asian lady beetles or habitually similar pests for preventing Asian lady beetles or habitually similar pests from gaining entrance to the building structure, the fibrous felt fabric further comprising a felt width, a felt length, a superior felt surface, an inferior felt surface, and a felt thickness, the superior felt surface having light reflective, pest-attracting coloration for attracting Asian lady beetles or habitually similar pests, the inferior felt surface for receiving evenly spaced adhesive strips, the felt thickness measuring about $1/16$ inch for retaining an effective amount of the pesticide composition; and a plurality of evenly spaced adhesive strips for adhesively attaching the fibrous felt fabric to the building structure, the adhesive strips each further comprising a superior adhesive surface, an inferior adhesive surface, a strip length, and a strip thickness, the superior adhesive surfaces each having exposed adhesive for attachment to the inferior felt surface, the superior adhesive surfaces being adhesively attached to the inferior felt surface, the inferior adhesive surfaces each further comprising selectively removable adhesive covering means, the adhesive covering means for selectively exposing the inferior adhesive surfaces for adhesive attachment to the building structure, the strip thickness measuring about $1/32$ inch for attaching the fibrous felt fabric in snug adjacency to the building structure, the snugly adjacent fibrous felt fabric for physically contacting Asian lady beetles or habitually similar pests attempting to gain entrance to the building structure by maneuvering intermediate the fibrous felt fabric and the building structure, the Asian lady beetles or habitually similar pests each having a pest height, the pest height being greater in magnitude than the strip thickness, the snugly adjacent fibrous felt fabric thus directly depositing pesticide composition on Asian lady beetles or habitually similar pests attempting to gain entrance to the building structure, the snugly adjacent fibrous felt fabric thus further preventing Asian lady beetles and habitually similar pests from gaining entrance to the building structure.

2. The article of manufacture of claim 1 wherein the fibrous felt fabric comprises polyester felt fabric.

3. The article of manufacture of claim 2 wherein the evenly spaced adhesive strips are aligned laterally across the felt width, the adhesive strips being spaced to assist in maintaining the length of fibrous felt fabric in snug adjacency to the building structure, the strip lengths each being substantially equal in dimension to the felt width.

4. The article of manufacture of claim 2 wherein two evenly spaced adhesive strips are aligned longitudinally along the felt length, the adhesive strips being spaced apart to assist in maintaining the length of fibrous felt fabric in snug adjacency to the building structure, the strip lengths each being substantially equal in dimension to the felt length.

* * * * *

UNITED STATES PATENT AND TRADEMARK OFFICE
CERTIFICATE OF CORRECTION

PATENT NO. : 6,824,850 B2
DATED : November 30, 2004
INVENTOR(S) : Robert M. Nourigat It is certified that error appears in the above-identified patent and that said Letters Patent is hereby corrected as shown below:

Column 7,
Line 8, after "reflective" insert -- pest-attracting --.

Column 9,
Line 50, change "FIG. 5" to -- FIG. 5(a) --.
Line 66, after "eighteen" insert -- inches --.

Signed and Sealed this

Twenty-sixth Day of July, 2005

JON W. DUDAS
*Director of the United States Patent and Trademark Office*